United States Patent
Deguchi et al.

(10) Patent No.: US 7,609,483 B2
(45) Date of Patent: Oct. 27, 2009

(54) DATA STORAGE DEVICE WITH LOAD/UNLOAD TAB INCLINED TOWARDS A DISK

(75) Inventors: Takaaki Deguchi, Kanagawa (JP); Mutsuro Ohta, Kanagawa (JP); Hiroshi Matsuda, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 407 days.

(21) Appl. No.: 11/522,213

(22) Filed: Sep. 15, 2006

(65) Prior Publication Data

US 2007/0076323 A1    Apr. 5, 2007

(30) Foreign Application Priority Data

Sep. 30, 2005   (JP) .............................. 2005-286981

(51) Int. Cl.
    *G11B 5/55* (2006.01)
(52) U.S. Cl. .................. 360/254.7; 360/254.8; 360/255
(58) Field of Classification Search .............. 360/254.7, 360/254.8, 254.9, 255, 255.3
See application file for complete search history.

(56) References Cited

U.S. PATENT DOCUMENTS

| | | | |
|---|---|---|---|
| 6,181,529 B1 * | 1/2001 | Aoyagi et al. ................ | 360/255 |
| 6,765,762 B2 * | 7/2004 | Yanagihara .............. | 360/254.8 |
| 6,778,360 B2 | 8/2004 | Gillis et al. | |
| 2005/0030671 A1 * | 2/2005 | Lee et al. ..................... | 360/255 |
| 2006/0012919 A1 * | 1/2006 | Choi et al. ............... | 360/244.2 |
| 2006/0268463 A1 * | 11/2006 | Ohwe .......................... | 360/255 |
| 2007/0206330 A1 * | 9/2007 | Deguchi et al. .......... | 360/254.8 |
| 2007/0206331 A1 * | 9/2007 | Deguchi et al. ............. | 360/255 |

FOREIGN PATENT DOCUMENTS

| | | |
|---|---|---|
| CN | 1421032 A | 5/2003 |
| JP | 2001-291349 | 10/2001 |
| JP | 2004-152360 | 5/2004 |
| WO | 01/59769 A1 | 8/2001 |

* cited by examiner

*Primary Examiner*—Jefferson Evans
(74) *Attorney, Agent, or Firm*—Townsend and Townsend and Crew LLP; John Henkhaus

(57) ABSTRACT

Embodiments of the invention reduce the height of a ramp to provide a thin data storage device that is capable of inhibiting the deterioration of the dynamic characteristics at the time of loading/unloading. In one embodiment, a data storage device includes a head that accesses a recording region of a recording disk; a ramp that is positioned circumferentially apart from an outermost end of the recording disk to unload the head from a surface of the recording disk; and an actuator that includes a load beam for supporting the head and moves the head. The load beam includes a tab that is extended from a leading end section of the load beam, beyond the head support section of the load beam, and toward the recording disk, and slides over a ramp surface.

14 Claims, 13 Drawing Sheets

Fig. 2
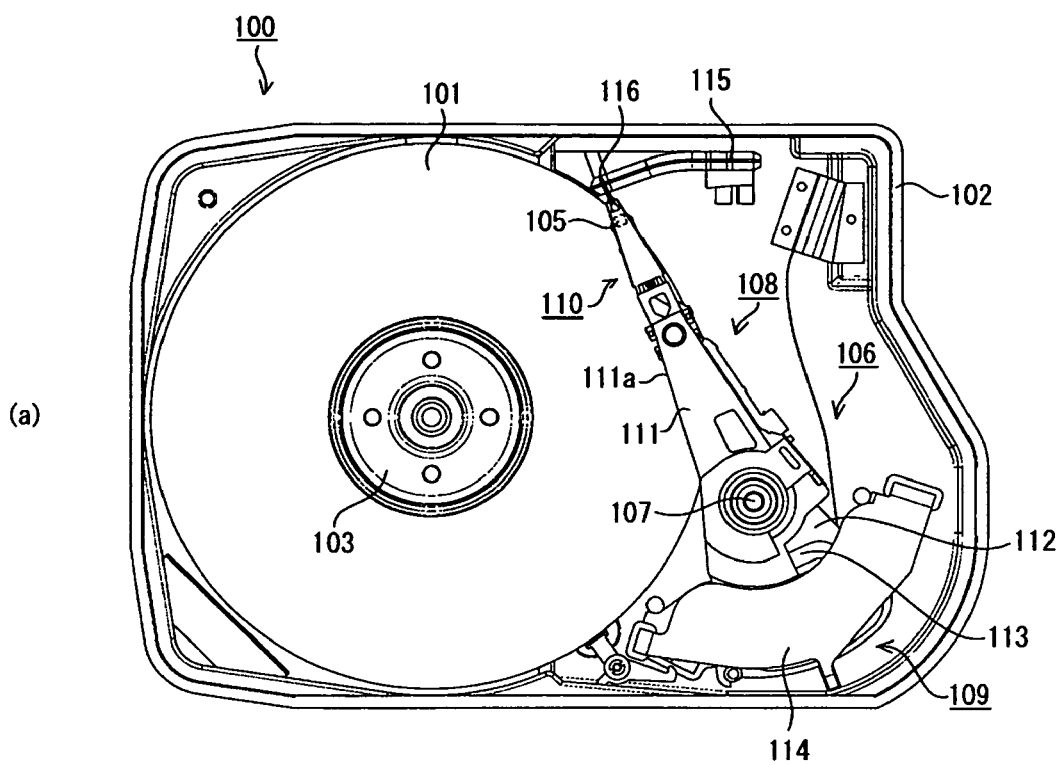
(a)
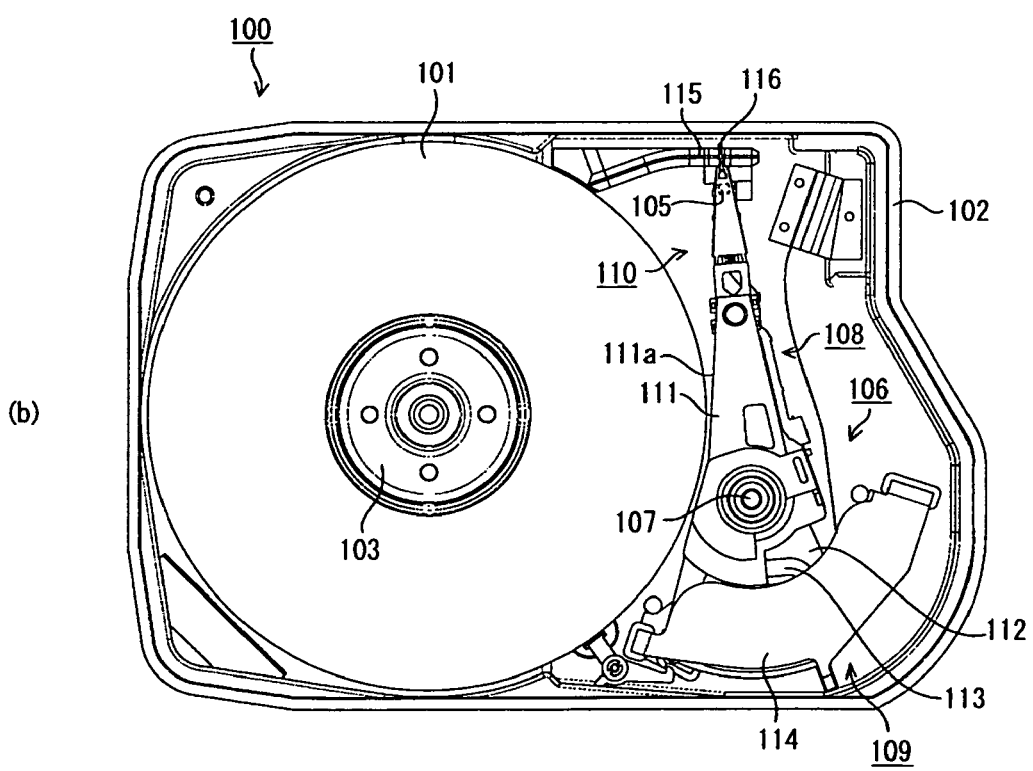
(b)

Fig. 6
(a)
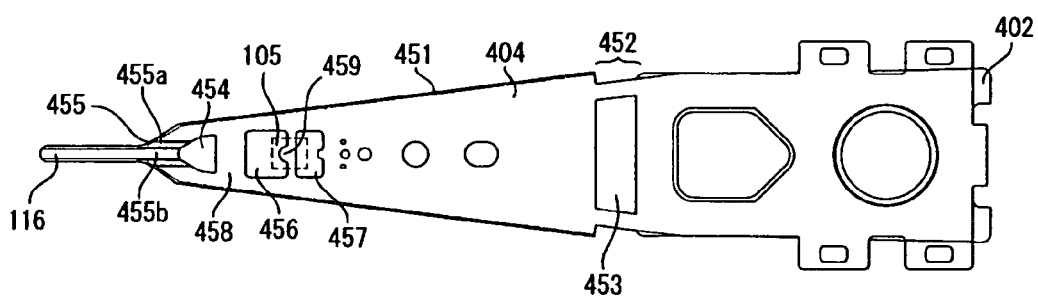
(b)
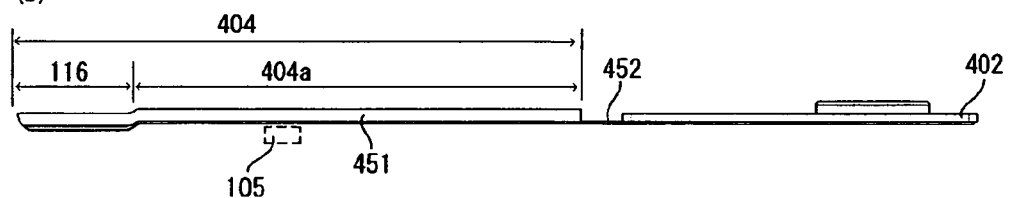
(c)
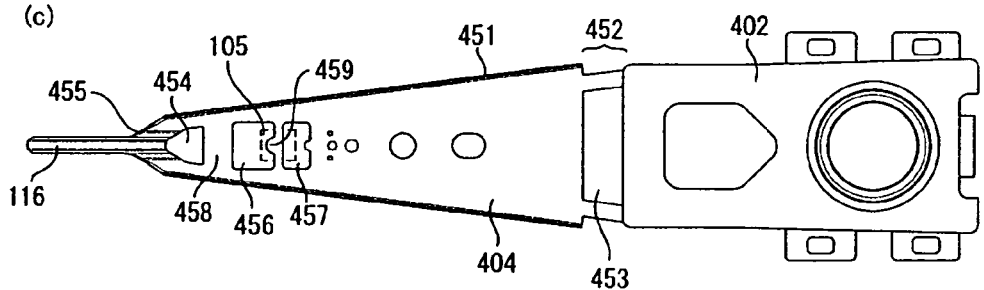

Fig. 1 2
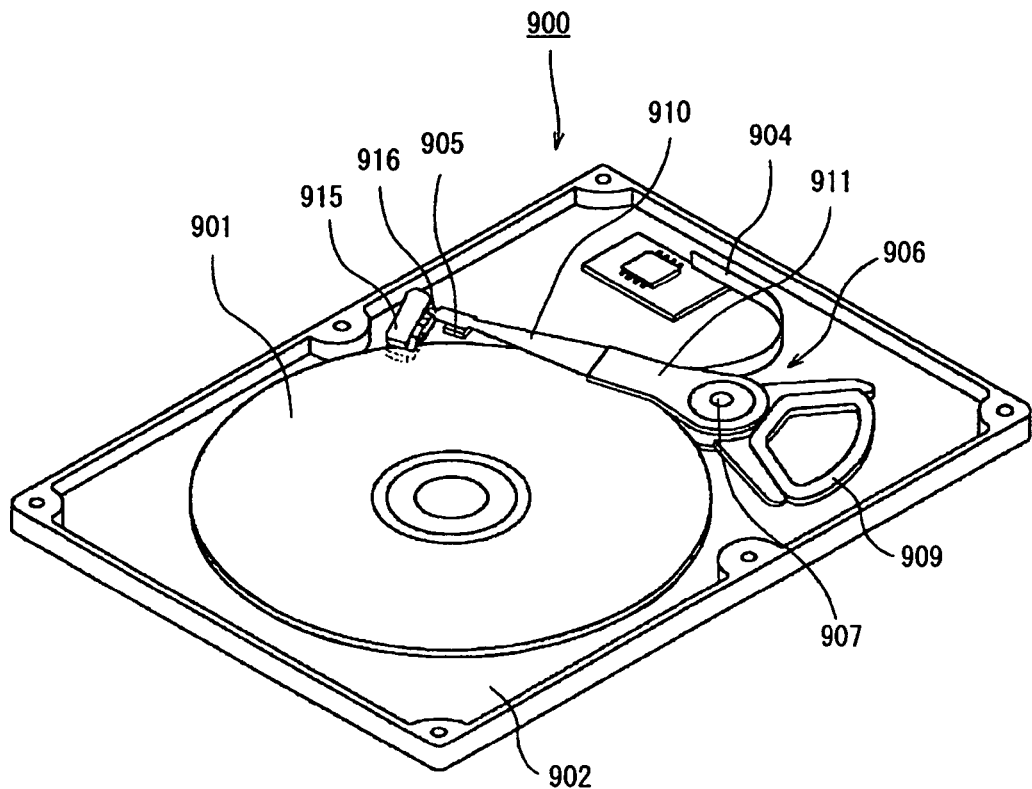
Fig. 1 3 (PRIOR ART)
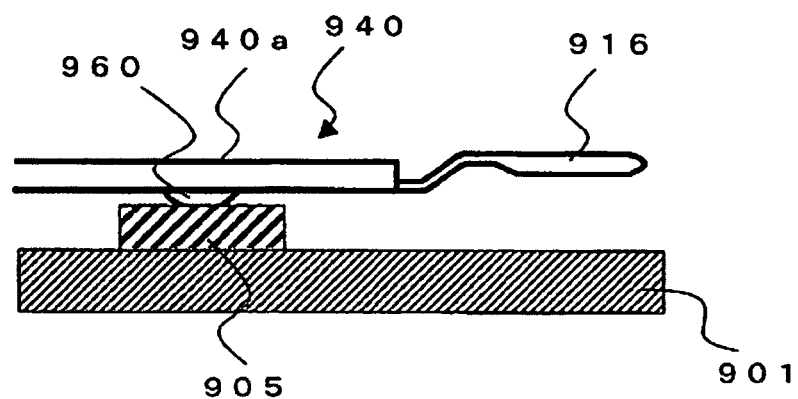

DATA STORAGE DEVICE WITH LOAD/UNLOAD TAB INCLINED TOWARDS A DISK

CROSS-REFERENCES TO RELATED APPLICATIONS

This application claims priority from Japanese Patent Application No. JP2005-286981, filed Sep. 30, 2005, the entire disclosure of which is incorporated herein by reference.

BACKGROUND OF THE INVENTION

The present invention relates to a data storage device, and more particularly to a data storage device configuration suitable for a load/unload type hard disk drive.

Various devices using optical disks, magnetic tapes, or other medium are known as a data storage device. Among others, a hard disk drive (HDD) is now widely used as a storage device for use with a computer and counted as an essential storage device for a present-day computer system. Thanks to its excellent characteristics, the hard disk drive has found an increasingly wide range of applications, including not only a computer system but also a motion picture recorder/player, a car navigation system, and a removable memory for use with a digital camera.

FIG. 12 is a perspective view illustrating the configuration of a conventional hard disk drive 900. As indicated in the figure, the conventional hard disk drive 900 comprises a base 902, a magnetic disk 901 for data recording, a suspension 910 whose leading end supports a head 905, an actuator 906 that includes the suspension 910 and an arm 911, and a ramp 915 for unloading the head 905.

The head 905 has a head element section, which is a thin-film element, and a slider. The head element section is mounted on a surface of the slider. The head element section has a write element section and a read element section. The write element section converts an electrical signal to a magnetic field in accordance with write data for a magnetic disk. The read element section converts a magnetic field generated from the magnetic disk to an electrical signal. Typically, the write element section and read element section are integrated as a single thin-film element.

When driven by a VCM (Voice Coil Motor) 909, the actuator 906 swings on a swing shaft 907 to move the head 905 to a desired position over the magnetic disk 901. This allows the head 905 to access a desired track, which is formed on the magnetic disk 901, and perform a data read/data write process. Power supply to the actuator 906 and signal exchange with the head 905 are performed via an FPC (Flexible Printed Circuit) 904, which is fastened to the arm 911.

This conventional hard disk drive 900 is a load/unload type hard disk drive so that the ramp 915 is positioned close to the outermost end of the magnetic disk 901. When the magnetic disk 901 stops rotating, the head 905 will be attracted to a surface of the magnetic disk 901. Therefore, when the magnetic disk 901 is about to stop rotating, the actuator 906 unloads the head 905 from a recording surface of the magnetic disk 901 to the ramp 915.

The suspension 910 is provided with a tab 916 at its leading end. When the tab 916 is led toward the ramp 915, the head 905 is unloaded as it moves from an area above the surface of the magnetic disk 901 to the outside. On the contrary, when the tab 916 moves away from the ramp 915, the head 905 is loaded as it moves from the outside of the magnetic disk 901 to an area above the surface of the magnetic disk 901. When the head 905 is about to become unloaded, the tab 916 needs to come into contact with the ramp 915 to move the head 905 away from the magnetic disk 901 while the head 905 is positioned over the magnetic disk 901. In the conventional hard disk drive 900, therefore, the magnetic disk 901 overlaps the ramp 915 and the actuator 906 in an unloading position.

FIG. 13 is a side view illustrating a load beam 940, which is at a leading end of the suspension 910 for use with the conventional hard disk drive 900. It shows a state of the load beam 940 that prevails when the head 905 is positioned over the magnetic disk 901.

As indicated in the figure, the head 905 is single-point-supported by a dimple 960 that is provided in the load beam 940, and flying at a predetermined height above the surface of the magnetic disk 901. The tab 916 is extended from the leading end of the load beam 940 and bent away from the magnetic disk 901. In other words, the positional relationship between the magnetic disk 901 and tab 916 is such that the tab 916 is formed and positioned higher than a head support section 940a of the load beam 940.

FIG. 14 is a cross-sectional view illustrating the ramp 915 used in the conventional hard disk drive 900. The figure shows the height of the tab 916 and the height of the ramp 915. In this document, the term "height" refers to the vertical distance from the recording surface of the magnetic disk.

As described earlier, the ramp 915 overlaps the magnetic disk 901. As indicated in the figure, the ramp 915 has a protrusion 915a, which protrudes and overlaps a peripheral surface of the magnetic disk 901.

The height of the ramp 915 is equal to A+H3+H4. The height A is the vertical distance between the surface of the magnetic disk 901 and the tab 916 that prevails when the head 905 is positioned over the magnetic disk 901. It is the height at which the tab 916 first comes into contact with the ramp 915 for unloading purposes. The height H3 is a mechanical error. It is a relative height error (3σ) between the ramp 915 and tab 916. The height H4 is a lift amount that is necessary for lifting the tab 916 to move the head 905 away from the surface of the magnetic disk 901.

Since the conventional ramp 915 needs to overlap the magnetic disk 901, it is necessary that the height A be greater than H1+H2+H3. The height H1 is the vertical distance between the surface of the magnetic disk 901 and the surface, of the protrusion 915a, opposite the magnetic disk 901. The height H1 is a margin for preventing the magnetic disk 901 from coming into contact with the ramp 915. It includes mechanical errors of the magnetic disk 901 and ramp 915. The height H2 is the height of a curved leading end surface (R) of the protrusion 915a. When the radius of the curved leading end surface is r and the inclination of the surface of the protrusion 915a is θ, H2=r(cos θ). Since the ramp 915 is made of resin, the surface of the leading end of the protrusion 915 is curved.

If, for instance, the height A is less than H1, the tab 916 is positioned between the protrusion 915a and magnetic disk 901 at the time of unloading so that loading cannot be accomplished any longer. If the height A is less than H1+H2, unloading cannot be accomplished because the tab 916 is caught by the curved leading end surface of the protrusion 915a at the time of unloading.

Conventional load/unload type hard disk drives are disclosed by Patent Documents 1 to 4: (1) Japanese Patent Laid-open No. 2001-291349; (2) Japanese Patent Laid-open No.

2004-152360; (3) Japanese Patent Laid-open No. 2005-11511; and (4) U.S. Pat. No. 6,778,360.

BRIEF SUMMARY OF THE INVENTION

When the employed structure is such that the ramp overlaps the magnetic disk and that the tab is bent away from the magnetic disk, as described earlier, it is necessary that A>H1+H2+H3. It means that the ramp cannot be low because its height is limited. In this situation, it is difficult to produce a thin device.

As regards the hard disk drive disclosed by Patent Document 1, the ramp is provided outside the magnetic disk with the tab positioned close to the magnetic disk. However, the tab is not mounted on a leading end of the suspension, but is mounted on both the right- and left-hand ends and extended in a swing direction. When the tab comes into contact with the ramp at an end of the swing direction and not at the suspension center in a loading/unloading sequence, the suspension twists and greatly vibrates. Therefore, the dynamic characteristics of the suspension deteriorate.

As regards the hard disk drive disclosed by Patent Document 2, the ramp is provided outside the magnetic disk with the tab positioned close to the magnetic disk. However, the tab is not mounted on a leading end of the suspension, but is mounted at the base of the suspension. When the tab is mounted at the base of the suspension, the distance between the tab and the head is longer than when the tab is mounted on the leading end of the suspension. Therefore, the head is apart from a support point at the time of loading/unloading. Thus, the head greatly vibrates, thereby deteriorating the dynamic characteristics of the suspension (head) and causing the suspension to bow between the head and support point. Consequently, it is difficult to control or fine tune the tab lift amount.

As regards the hard disk drive disclosed by Patent Document 3 or 4, the tab is positioned close to the magnetic disk. However, the ramp overlaps with the magnetic disk. Therefore, the ramp height is limited as described earlier.

The present invention has been made in view of the above circumstances. The present invention may reduce the height of the ramp to provide a thin data storage device that is capable of inhibiting the deterioration of the dynamic characteristics at the time of loading/unloading.

According to one aspect of the present invention, there is provided a data storage device comprising: a head which accesses a recording region of a recording medium; a ramp which is positioned circumferentially apart from an outermost end of the recording medium to unload the head from a surface of the recording medium; and an actuator that includes a load beam for supporting the head and moves the head, wherein the load beam includes a head support section for supporting the head, and a tab which is extended forward, beyond the head support section, and toward the recording medium, and which slides over a surface of the ramp. In this data storage device, the ramp does not overlap the recording disk, and the tab is extended toward the recording disk from the load beam. This makes it possible to reduce the ramp height and produce a thin data storage device.

In the data storage device described above, it is preferred that the tab be extended from the center of the load beam. This makes it possible to inhibit the deterioration of the dynamic characteristics.

If the tab is in contact with the ramp in the data storage device described above, it is preferred that the vertical distance between the recording medium surface and a contact point between the tab and the ramp be nearly equal to or greater than the vertical distance between the recording medium surface and the farthest portion of the head support section from the recording medium surface. This makes it possible to produce a thin data storage device.

If the tab is in contact with the ramp in the data storage device described above, it is preferred that the vertical distance between the recording medium surface and the farthest portion of the head support section from the recording medium surface be greater than the vertical distance between the recording medium surface and a contact point between the tab and the ramp. This makes it possible to provide enhanced impact resistance.

In the data storage device described above, it is preferred that the maximum vertical distance between the recording medium surface and the ramp surface include the height of a point of contact between the tab and the circumferential end of the ramp and a lift amount for moving the head away from the recording medium surface. This makes it possible to properly move the head away from the magnetic disk at the time of unloading.

In the data storage device described above, it is preferred that the distance between the tab and the recording medium surface include the amount of tab deflection that occurs upon impact. This makes it possible to reduce the ramp height while avoiding a failure that may occur upon impact.

In the data storage device described above, it is preferred that the tab be U-shaped as viewed from the ramp, and that a convex surface of the U-shaped tab slide over the ramp surface. This makes it possible to enhance the rigidity of the tab and inhibit the deterioration of the dynamic characteristics.

In the data storage device described above, it is preferred that the head support section include a flange which is formed by bending both rims that are extended in a longitudinal direction. This makes it possible to enhance the rigidity of the load beam and inhibit the deterioration of the dynamic characteristics.

In the data storage device described above, it is preferred that the flange be also formed on the tab. This makes it possible to enhance the rigidities of the load beam and tab and inhibit the deterioration of the dynamic characteristics.

In the data storage device described above, it is preferred that the flange be formed continuously between the tab and the head support section. This makes it possible to enhance the rigidities of the load beam and tab and inhibit the deterioration of the dynamic characteristics.

In the data storage device described above, it is preferred that the head exist above the recording disk at a position of contact between the tab and the ramp's circumferential end that is positioned beyond a position for unloading the head and toward the recording medium. This makes it possible to properly move the head away from the recording disk.

According to another aspect of the present invention, there is provided a data storage device comprising: a head that accesses a recording region of a recording medium; a ramp which is positioned circumferentially apart from an outermost end of the recording medium to unload the head from a surface of the recording medium; and an actuator which includes a load beam for supporting the head and moves the head, wherein the load beam includes a head support section for supporting the head, and a tab which is extended from the head support section's center on the side toward a leading end of the load beam, and which slides over a surface of the ramp. In this data storage device, the tab is extended from the center of the leading end of the load beam. This makes it possible to inhibit the deterioration of the dynamic characteristics.

The present invention makes it possible to reduce the height of the ramp to provide a thin data storage device that is capable of inhibiting the deterioration of the dynamic characteristics at the time of loading/unloading.

BRIEF DESCRIPTION OF THE DRAWINGS

FIG. 2 illustrates the exemplary schematic configuration of a hard disk drive according to the embodiment.

FIG. 6 illustrates the configuration of a load beam according to the embodiment.

FIG. 12 is a schematic diagram illustrating the configuration of a hard disk drive.

FIG. 13 is a side view illustrating the configuration of a suspension.

DETAILED DESCRIPTION OF THE INVENTION

Figure 1:
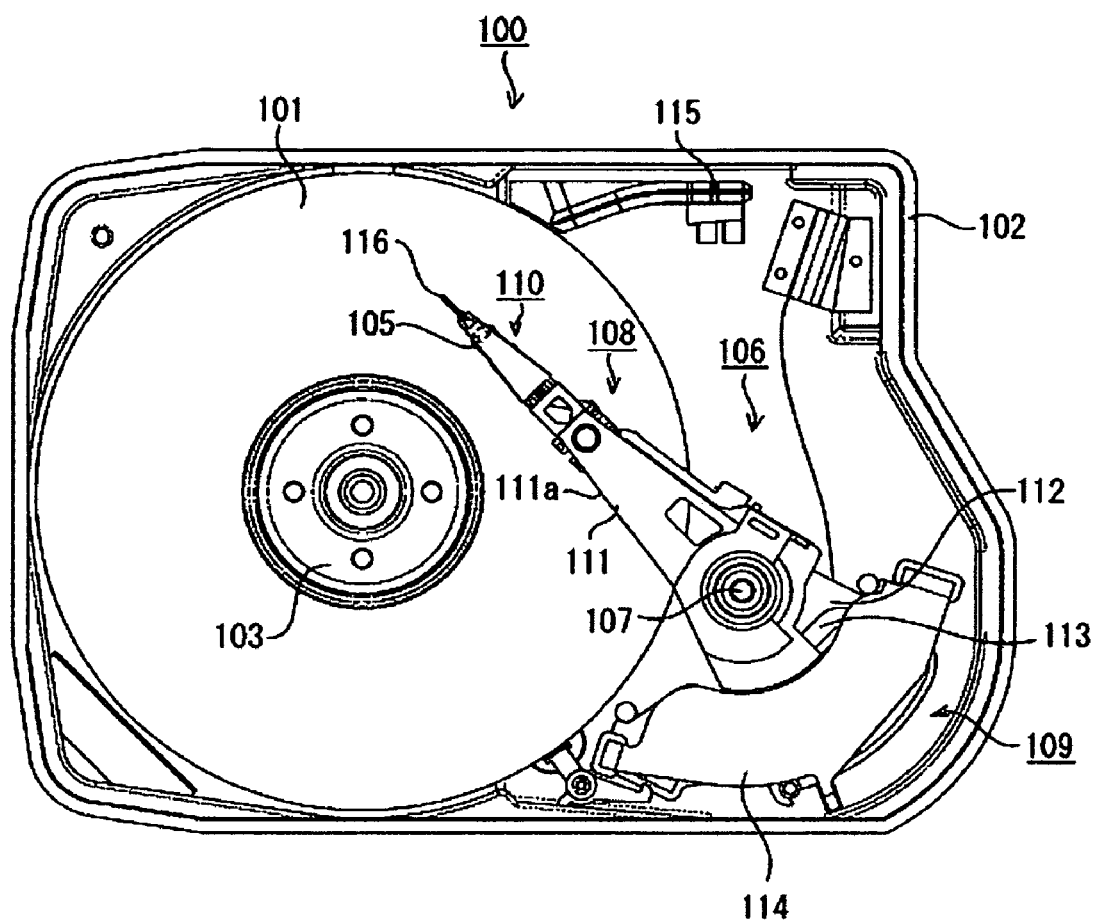
FIG. 1 is an exemplary schematic diagram illustrating the configuration of a hard disk drive according to an embodiment of the present invention.

An embodiment of the present invention will now be described. The following description of the embodiment is to be considered in all respects only as illustrative and not restrictive. The present invention is not limited to the embodiment described below. For purposes of clarity and understanding, the following description and the accompanying drawings are abbreviated or simplified as appropriate. It will be apparent to those skilled in the art that various changes, additions, and modifications may be readily made to the elements of the following embodiment without departing from the spirit and scope of the present invention. For brevity and clarity, like elements in the drawings are designated by like reference numerals and will not be described repeatedly.

FIG. 1 schematically illustrates the configuration of a hard disk drive (HDD) 100 according to an embodiment of the present invention. FIG. 1 shows a state of the hard disk drive 100 that prevails when an actuator is in an operating position. In FIG. 1, the reference numeral 101 denotes a data storage medium (recording disk). It is a nonvolatile magnetic recording disk that records data by magnetizing a magnetic layer. The reference numeral 102 denotes a base. A disk enclosure is formed when the base 102 is fastened to a cover (not shown) that covers an upper opening in the base 102 via a gasket (not shown). The disk enclosure houses the elements of the hard disk drive 100 in a hermetically sealed state.

The reference numeral 103 denotes a clamp that fastens the magnetic disk 101 to a spindle motor (not shown). The spindle motor, which is fastened to the bottom of the base 102, rotates the magnetic disk 101 at a predetermined speed. While the hard disk drive 100 is not operating, the magnetic disk 101 is stationary. The reference numeral 105 denotes a head that accesses a recording region of the magnetic disk. The head 105 has a head element section and a slider. The head element section is fastened to the slider. The head element section includes a write head section and a read head section, which are constructed of one piece. The write head converts an electrical signal to a magnetic field in accordance with write data. The read head converts a magnetic field generated from the magnetic disk to an electrical signal. The write head and read head may alternatively be formed separately. Further, the present invention may also be applied to a hard disk drive having either the write head or the read head.

The reference numeral 106 denotes an actuator, which retains and moves the head. In FIG. 1, the actuator 106 is retained by a swing shaft 107 for swingable movement. The actuator 106 includes a carriage 108 and a VCM (Voice Coil Motor) 109, which serves as a drive mechanism. The carriage 108 includes various component members, which are a suspension 110, an arm 111, and a coil support 112 in order named as viewed from the leading end on which the head 105 is mounted.

The configuration of the suspension 110 will be described in detail later. The suspension 110 is joined, by caulking, to a surface of the arm 111 that faces the magnetic disk 101. From the viewpoint of dynamic characteristics, it is preferred that the weight of the suspension 110 be symmetrical about a line that joins the center of the swing shaft to the slider for the head 105. For reduction of twist mode vibration, it is also preferred that the outer shape of the arm 111 be symmetrical about a line that joins the swing shaft center of the arm 111 to the slider for the head 105.

The reference numeral 112 denotes a coil support, which retains a flat coil 113. The reference numeral 114 denotes an upper stator magnet retaining plate, which is fastened to the base 102. The flat coil 113 is sandwiched between the upper stator magnet retaining plate and a lower stator magnet retaining plate (not shown).

The reference numeral 115 denotes a ramp, which is used to unload the head 105 from a surface of the magnetic disk 101 when the magnetic disk 101 stops rotating. The reference numeral 116 denotes a tab, which is formed on a leading end of the suspension 110. The ramp 115 is mounted on a bottom or lateral surface of the base 102 by a support that is positioned away from a track of the tab 106.

The ramp 115 is positioned close to the outermost end of the magnetic disk 101. In the hard disk drive 100 according to the present embodiment, the ramp 115 is positioned apart from the outermost end of the magnetic disk 101. Since the ramp 115 does not overlap the magnetic disk 101, the height of the ramp 115 may be reduced. Further, it also makes it possible to avoid air attrition that may occur between a rotating magnetic disk 101 and the ramp 115, and suppress the windage-loss-induced power consumption. Furthermore, it is possible to assure an uninterrupted steady fly of the head 105 by preventing the ramp 115 from disturbing the air current over the magnetic disk 101, and provide unobstructed head tracking by inhibiting the actuator 106 from being vibrated.

In accordance with a drive signal that flows from a controller (not shown) to the flat coil 113, the VCM 109 may swing the carriage 108 on the swing shaft 107 and move the head 105 to an area above the recording surface of the magnetic disk 101 or move the head 105 from the recording surface of the magnetic disk 101 to the ramp 115.

To read data from or write data onto the magnetic disk 101, the actuator 106 moves the head 105 to a place above a data area on the surface of the rotating magnetic disk 101. When the actuator 106 swings, the head 105 moves in a radial direction over the recording surface of the magnetic disk 101. This allows the head 105 to access a desired track. The force generated by an ABS (Air Bearing Surface) of the slider, which faces the magnetic disk 101, balances with a pushing force generated by the suspension 110. This causes the head 105 to fly a predetermined distance above the magnetic disk 101.

When the magnetic disk 101 stops rotating, the head 105 comes into contact with or adheres to the surface of the magnetic disk 101. When the head 105 comes into contact with the magnetic disk surface or is removed from the magnetic disk surface, it damages the data area. Further, when the head 105 adheres to the magnetic disk surface, the magnetic disk 101 cannot rotate. To avoid such problems, the actuator 106 unloads the head 105 from the surface of the magnetic disk 101 and moves the head 105 to the ramp 115. FIG. 2(*a*) shows the head 105 that is unloaded from the surface of the magnetic disk 101. The actuator 106 swings toward the ramp 115, and the tab 116 on the leading end of the actuator comes into contact with the sliding surface of the ramp 115. At this time, the head 105 is flying above the rotating magnetic disk 101. Further, the actuator 106 swings away from the magnetic disk 101 (toward the right-hand side in FIG. 2(*a*)). The tab 116 moves while sliding over the sliding surface of the ramp 115, reaches a stop surface of the ramp 115, and stops at a stop position (home position). The unloading process is now completed for the magnetic head 105. FIG. 2(*b*) shows the actuator 106 that is stopped at the home position while the hard disk drive is not operating.

Figure 3:
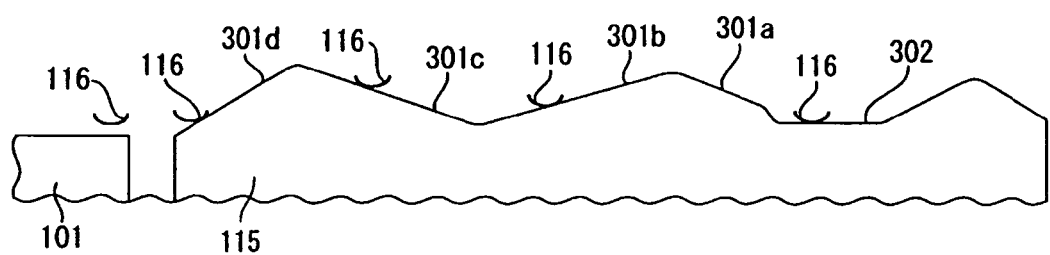
FIG. 3 illustrates how a tab moves in relation to a ramp according to the embodiment.

The loading/unloading movement of the tab 116 in relation to the ramp 115 will now be described with reference to FIG. 3. In FIG. 3, the reference numeral 301 denotes the sliding surface of the ramp 115 over which the tab 116 slides. For loading/unloading, the tab 116 moves while maintaining contact with the sliding surface 301. The sliding surface 301 has a plurality of inclined surfaces 301*a*-301*d*. The reference numeral 302 denotes the stop surface over which the tab 116 stops. The tab 116 slides over the stop surface 302 as well. The stop surface 302 is flat unlike the inclined surfaces that constitute the sliding surface 301. While the hard disk drive is not operating, the tab 116 is stopped over the stop surface 302.

In a loading sequence, the tab 116 leaves the home position over the stop surface 302 and moves toward the magnetic disk 101. The tab 116 slides over the sliding surface 301 in the 301*a*, 301*b*, 301*c*, and 301*d* order, leaves inclined surface (sliding surface) 301*d*, and moves to a place over the magnetic disk 101. In an unloading sequence, the tab 116 moves in the reverse direction. More specifically, the tab 116 leaves the magnetic disk 101 and moves toward the ramp 115. The tab 116 leaves the outermost end of the magnetic disk 101, comes into contact with inclined surface 301*d* of the sliding surface, and moves toward the end of the ramp 115 that is positioned opposite the magnetic disk 101. The tab 116 slides over the sliding surface 301 in the 301*d*, 301*c*, 301*b*, and 301*a* order, and then stops over the stop surface 302.

In the present embodiment, the magnetic disk 101, actuator 106, and ramp 115 do not overlap each other. Therefore, the assembly process for the hard disk drive 100 is facilitated. More specifically, the magnetic disk 101 may be mounted after the actuator 106 and ramp 115. When the magnetic disk 101 is mounted after the ramp 115 and actuator 106 are mounted, the dust generated due to the mounting of the ramp 115 or actuator 106 may readily accumulate on the magnetic disk 101. The dust is generated when, for instance, screws are scraped in a screw tightening sequence. The dust attached to a tool or human hand may fall during a mounting process and accumulate on the magnetic disk. The dust may damage the head 105 or obstruct accurate data access, thereby degrading the reliability of the device. When the magnetic disk 101 is mounted after the ramp 115 and actuator 106 as described above, it is possible to effectively reduce the amount of dust that accumulates on the mounted magnetic disk 101.

For simplicity, the foregoing description assumes that the hard disk drive has one magnetic disk 101 that is used for dual surface recording. However, when a plurality of magnetic disks are used for dual surface recording, the plurality of magnetic disks are retained in an integrated fashion and arranged at predetermined spacing intervals in the direction of the spindle motor rotation axis. The suspension for retaining a recording surface scanning head is furnished for each recording surface. The suspension is fastened to the coil support 112 via an arm at a position at which the coil support 112 overlaps the suspension 110 shown in FIG. 1 at predetermined intervals. The present invention may also be applied to a hard disk drive having a single surface recording magnetic disk. In the hard disk drive having a single surface recording magnetic disk, the ramp bottom surface may be properly fastened to the base surface because the tab for the lower suspension need not be considered.

The configuration of the suspension 110 according to the present embodiment will now be described in detail. Since the ramp 115 and the actuator 106 in the stop position (unloading position) are positioned apart from the outermost end of the magnetic disk 101, the suspension 110 has a peculiar structure. Especially, the suspension 110 has the tab 116 at its leading-end center. When the tab 116 runs onto the ramp 115 or leaves the ramp 115, it is necessary that the head 105 be flying above a rotating magnetic disk 101. Therefore, the tab 116 has at least a predetermined length to satisfy the above condition. Further, the suspension 110, which includes the tab 116, is formed to have rigidity appropriate for the long tab 116.

Figure 4:
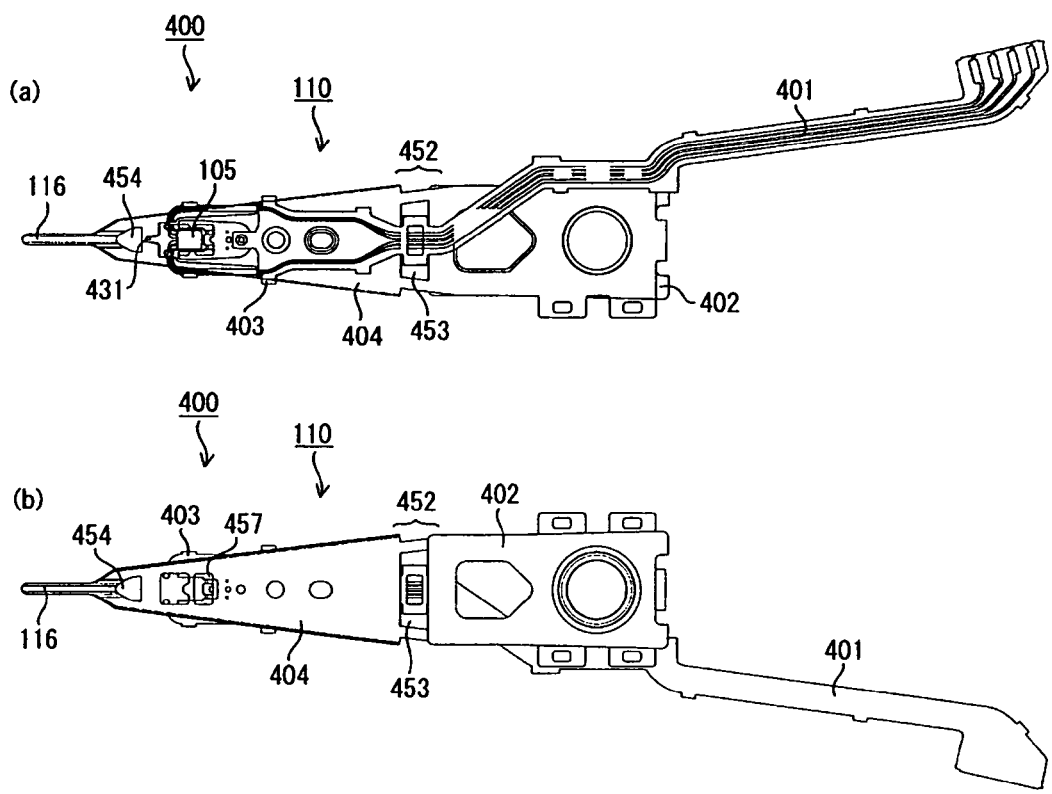
FIG. 4 illustrates the configuration of a head-suspension assembly according to the embodiment.
Figure 5:
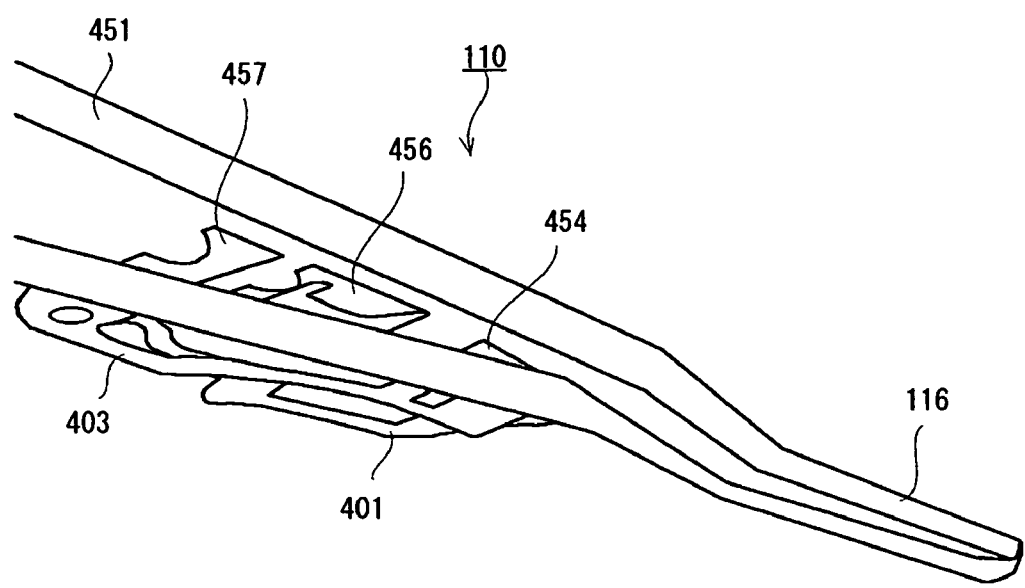
FIG. 5 is a perspective view illustrating the configuration of a head-suspension assembly according to the embodiment.

FIG. 4 includes plan views that schematically show the configuration of a head-suspension assembly 400 for use in the present embodiment. FIG. 5 is a perspective view illustrating the head-suspension assembly 400. FIG. 4(*a*) shows the configuration of the head-suspension assembly 400 as viewed from the magnetic disk 101. FIG. 4(*b*) shows the configuration of the head-suspension assembly 400 as viewed from the opposite side, that is, the rear side.

In the present embodiment, the head-suspension assembly 400 comprises a plurality of component members. It includes the head 105, an FPC (Flexible Printed Circuit) 401, and the suspension 110. In the present embodiment, the suspension 110 comprises a plurality of component members. It includes a mount plate 402, gimbals 403, and a load beam 404.

The FPC 401 has a plurality of leads. Each lead is connected to a pad that is formed on the slider for the head 105. The FPC 401 is glued to the gimbals 403. Alternatively, however, the FPC 401 may be integral with the gimbals 403.

The mount plate 402 and gimbals 403 are both laser spot welded to the load beam 404. The gimbals 403 is welded to the front of the load beam 404. As regards the suspension component members, the term "front" refers to the leading end side of the suspension (the side toward the tab), whereas the term "rear" refers to the base side of the suspension (the side toward the swing shaft). A gimbal tab 431 is formed on the front of the gimbals 403. If any external impact is received while the head 105 is unloaded to the ramp 115, the gimbal tab 431 comes into contact with the ramp 115 to prevent the head-suspension assembly 400 from being damaged.

A gimbal tongue (not shown), which is shaped like a tongue and protrudes toward the center of the gimbals 403, is formed on the rear of the gimbal tab 431. The head 105 is fastened to the gimbal tongue by, for instance, using a low-elasticity epoxy resin. The gimbal tongue is single-point-supported by a dimple (not shown) in the load beam 404.

The gimbals 403 is welded to the load beam 404 at its base section (not shown) on the rear thereof and not welded at its front section including the gimbal tongue so as to be free.

FIG. 6 illustrates the configuration of the load beam 404. FIG. 6(*a*) shows the side that retains the head 105. FIG. 6(*b*) is a side view. FIG. 6(*c*) shows the bottom side of the side that retains the head 105. The structure of the suspension 110 according to the present embodiment will now be described with reference to FIGS. 4 to 6. The load beam 404 is made of a stainless metal or other plate material to function as a precision thin-plate spring. The load beam 404 is shaped to maintain necessary rigidity while being thin and lightweight. The tab 116 is formed on the leading end of the load beam 404 so as to project therefrom. The tab 116 is integral with the load beam 404, extended forward from the leading end section of the load beam 404, and bent toward the magnetic disk 101. Since the tab 116 is integral with the load beam 404, it is possible to avoid an increase in the weight of the load beam 404 (and the suspension 110) and inhibit the deterioration of the dynamic characteristics. As shown in FIG. 6(*b*), the load beam 404 comprises the tab 116 and a head support section 404*a*. The tab 116 is formed to unload the head to the ramp. The head support section 404*a* is a section that supports the head except for the tab 116. For example, the head support section 404*a* is a portion that lies between the base of the load beam 404 and a bend for tab formulation, and the tab 116 is a portion that lies between the bend and the leading end of the load beam 404.

As shown in FIGS. 4 and 6, the tab 116 is positioned at the leading end section of the load beam 404 and formed at the center in the direction of the short side of the load beam 404 (in the swing direction of the suspension 110). This makes it possible to restrain the vibration component in the twist direction (roll direction) of the suspension 110 and inhibit the deterioration of the dynamic characteristics. In the suspension 110 according to the present embodiment, the tab 116 is formed over the symmetry axis of the suspension 110 and load beam 404. The symmetry axis becomes the center axis for vibration in the twist direction. Since the tab 116 is formed over the center axis for vibration in the twist direction, the vibration component may be effectively suppressed.

The tab 116 has a predetermined length to permit itself to run onto the ramp 115 (unloading), which is positioned apart from the magnetic disk 101, and move from the ramp 115 to the surface of the magnetic disk 101 (loading) as described earlier. It is therefore necessary that the tab 116 be shaped to enhance its rigidity. As shown in FIGS. 5 and 6, the tab 116 according to the present embodiment is bent in the direction of the short side (in the swing direction). More specifically, the tab 116 is U-bent so that the cross-section in the direction of the short side is U-shaped. The tab 116 may be press-formed. The rigidity of the tab 116 may be enhanced when it is U-bent.

From the viewpoint of rigidity and contact for sliding over the ramp 115, it is preferred that the cross section of the tab 116 be U-shaped (or shaped like an arc). Alternatively, however, the tab 116 may be V-shaped or otherwise shaped to enhance its rigidity.

Referring to FIGS. 5 and 6, a flange 451 is formed on both rims of the load beam 404, which are positioned in the longitudinal direction of the load beam 404, that is, in the direction from the tab 116 (front) to the swing shaft 107 (rear). The flange 451 is continuously formed from the foremost end of a hinge section 452 (the side toward the tab 116) to the leading end of the tab 116 and oriented toward the leading end section of the load beam 404. The hinge section 452 is formed close to the foremost end of the mount plate 402 (the end positioned toward the tab). As shown in FIG. 6, an opening 453 is formed in the hinge section 452. The flange 451 is extended to the tab-side end of the hinge section 452. The hinge section 452 generates load on the head 105 by generating elastic force toward the magnetic disk 101 (gimbals 403).

The flange 451 may be press-formed by bending a rim of the load beam 404 in a direction toward the rear of the surface to which the head 105 is fastened (in an upward direction in FIG. 5). An alternative design may be adopted so as to bend the rim toward the surface to which the head 105 is fastened. The rigidity of the load beam 404, including the tab 116, may be enhanced by the flange 451. Especially in the present embodiment, the flange 451 is formed between the tab side end face of the head 105 and the leading end, that is, between the position at which the foremost end of the head 105 is placed and the leading end of the tab 116. When the flange 451 on the rim of the head support section 404*a* on the load beam 404 is continuously integral with the U-shaped rim of the tab 116, the deterioration of the dynamic characteristics and rigidity may be effectively inhibited for the suspension 110 having the long tab 116. From the viewpoint of rigidity, it is preferred that the flange 451 be as long as possible. In the present embodiment, therefore, the flange 451 is formed until it reaches the tab side end of the hinge section 452.

An opening 454 is formed near the leading end of the load beam 404. The opening 454 makes it possible to shape the tab 116 as desired. A draw section 455, which is bent in the direction of the short side of the load beam 404, is formed between the foremost end of the opening 454 and the tab 116. The width of the draw section 455 decreases progressively as it goes from the head support section 404*a* of the load beam 404 to the tab 116. The draw section 455 increases the rigidity prevailing near the leading end section of the load beam 404, and allows the tab 116 to be U-bent. As indicated in the figures, the draw section 455 includes a portion 455*a* that is extended from the foremost end of the opening 454 to the leading end section of the load beam 404 and bent in the same direction as the flange 451, and a portion 455*b* that is shaped the same as the tab 116 and extended from the tab 116 to the foremost end of the opening 454. Portion 455*b* and portion 455*a* are formed contiguously, and portion 455*a* is bent toward the head 105.

Openings 456 and 457 are formed behind opening 454. Opening 456 is formed, for instance, at a position that overlaps the foremost end face of the head 105, and used to clamp the head when the head 105 is to be mounted. Opening 457 is used, for instance, to retain a limiter tab for the gimbals 403 and control the deformation of the gimbals 403. A protrusion 459 is substantially positioned at the center of a rear side of opening 456 (positioned toward the swing shaft 107). This protrusion 459 protrudes toward the center of opening 456. The protrusion 459 is provided with a dimple (not shown), which bulges toward the gimbals 403 (toward the head 105).

Opening 454 and opening 456 are not contiguous or integral with each other. These openings are separated by a bridge section 458. The bridge section 458 is formed between openings 454 and 456 to enhance the rigidities of the load beam 404 and suspension 110.

Figure 7:
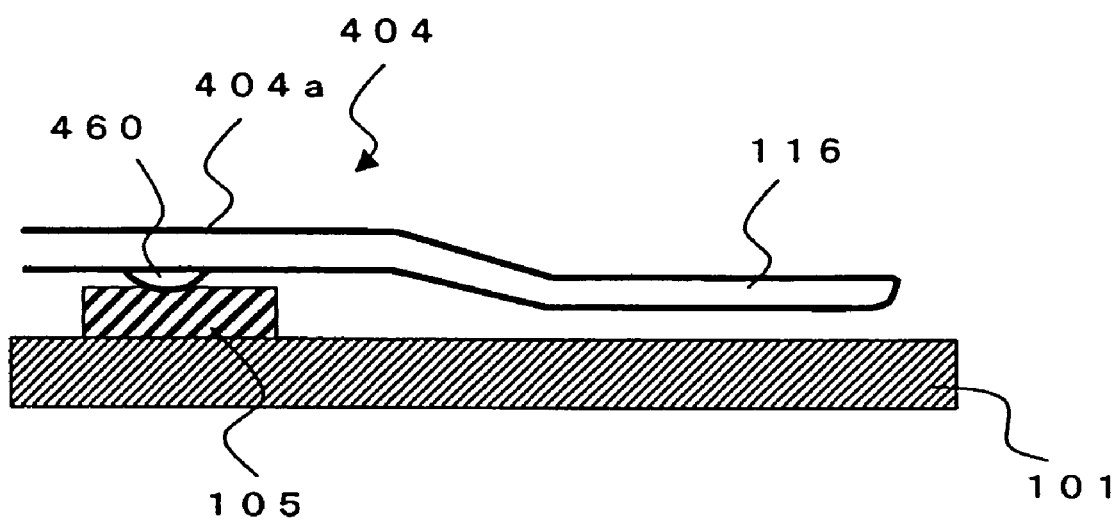
FIG. 7 is a side view illustrating the configuration of a suspension according to the embodiment.

FIG. 7 is a side view of the load beam 404. It indicates a state of the load beam 404 that prevails while the head 105 is positioned over the magnetic disk 101. The FPC 401 and gimbals 403 are excluded from the figure.

As shown in the figure, the head 105 is single-point-supported by a dimple 460 that is provided in the load beam 404, and flies a predetermined distance above the surface of the magnetic disk 101. As described earlier, the tab 116 is extended from the leading end section of the load beam 404 and bent toward the magnetic disk 101. In other words, the tab 116 is lower than the head support section 404a of the load beam 404 while it is positioned over the magnetic disk 101.

Figure 8:
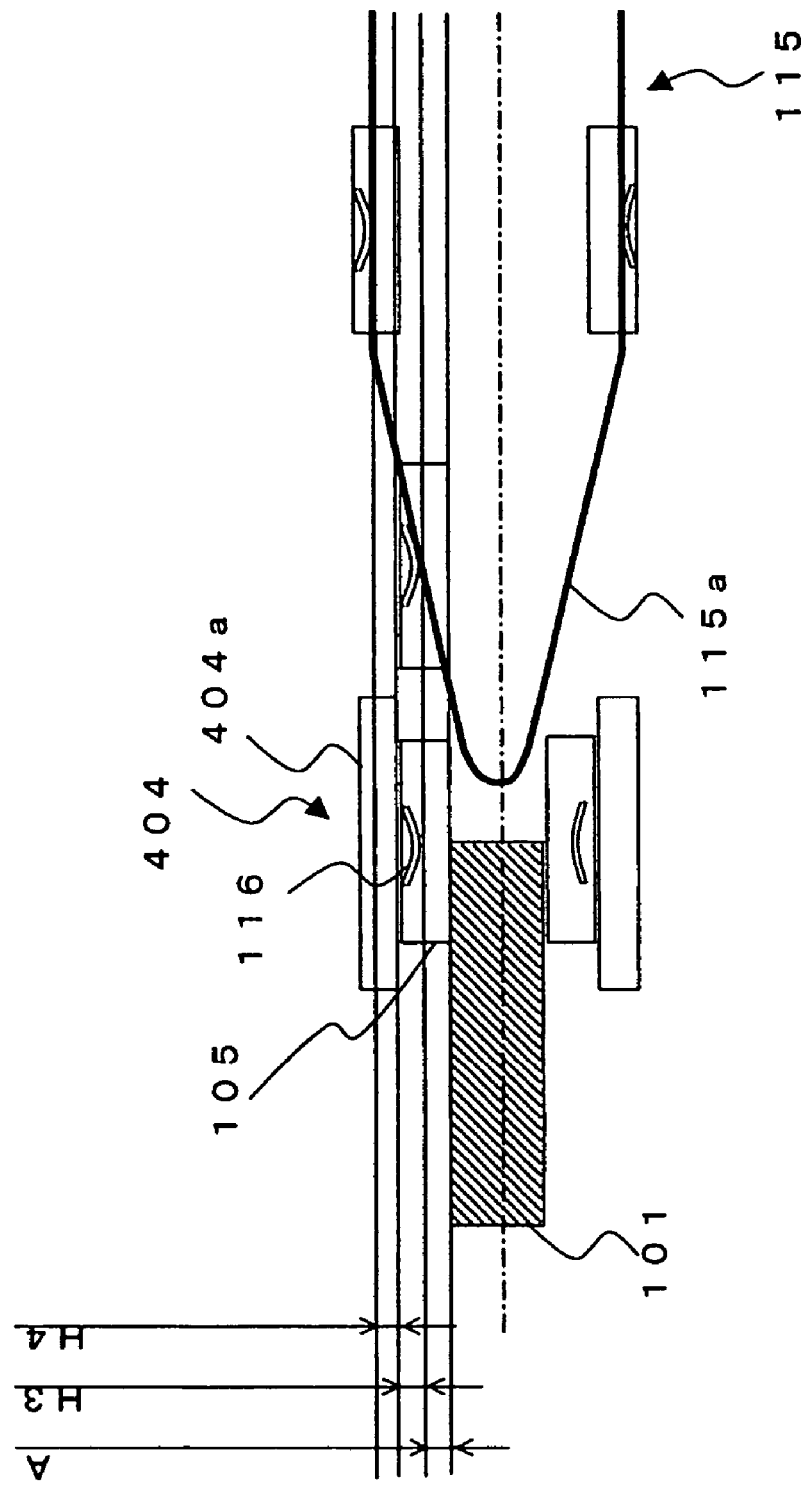
FIG. 8 illustrates the heights of a tab and a ramp in accordance with the embodiment.

FIG. 8 is a cross-sectional view of the ramp 115. This figure shows the heights of the tab 116 and ramp 115. As described earlier, the ramp 115 is positioned apart from the outermost end of the magnetic disk 101. As shown in the figure, the ramp 115 has a protrusion 115a that protrudes toward a lateral surface of the outermost end of the magnetic disk 101.

Figure 14:
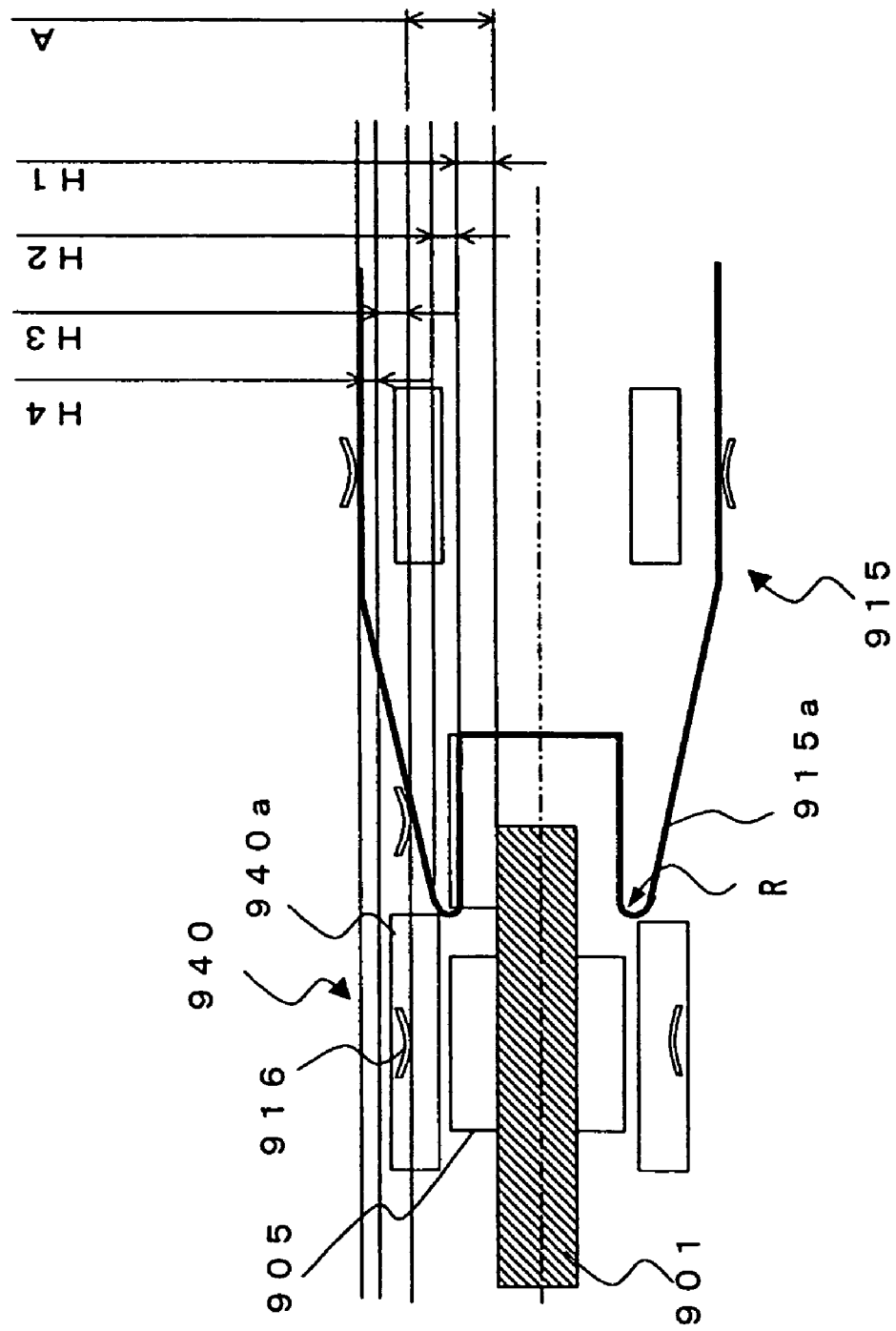
FIG. 14 illustrates the heights of a conventional tab and a ramp.

The height of the ramp 115 is equal to A+H3+H4. As described with reference to FIG. 14, the height A is the vertical distance between the surface of the magnetic disk 101 and the tab 116 that prevails when the head 105 is positioned over the magnetic disk 101. It is the height of a contact point (the contact point at which the tab comes into contact with the circumferential end of the ramp that is positioned between the head unloading position and magnetic disk) at which the tab 116 first comes into contact with the ramp 115 for unloading purposes. The height H3 is a relative height error (3σ) between the ramp 115 and tab 116. It is a mechanical error that includes, for instance, a ramp mounting surface error of the base, a ramp shape error, a spindle motor hub surface error relative to the base, a magnetic disk thickness error, a deflection-induced error that occurs when the magnetic disk is clamped, a PRO error caused by magnetic disk rotation, and a tab height error relative to the head (slider). The height H4 is a lift amount that is necessary for lifting the tab 116 to move the head 105 away from the surface of the magnetic disk 101. The lift amount is determined while considering the lift amount of the head 105 and the contact between the head 105 and magnetic disk 101 during loading. If, for instance, the height of the ramp 115 is rendered equal to A without considering the height H3 or H4, the tab 116 does not come into contact with the inclined surface of the ramp 115. Therefore, the tab 116 is moved out of the magnetic disk 101 without lifting the tab 116 or separating it from the magnetic disk 101. Such tab movement makes the head 105 defective and damages the magnetic disk 101. To separate the head 105 from the magnetic disk 101, it is preferred that the height of the ramp 115 include at least the height A and height H4.

In the present embodiment, the ramp 115 does not overlap the magnetic disk 101. Therefore, the present embodiment does not require the heights H1 and H2 unlike the conventional example. It means that the height A may be reduced in the present embodiment. In addition, the tab 116 is bent toward the magnetic disk from the head support section 404a of the load beam. Therefore, the height A may be further reduced. In other words, when the tab 116 first comes into contact with the inclined surface of the ramp 115 (the recording disk side end of the ramp 115) during an unloading sequence, the tab 116 is positioned lower than the head support section 404a of the load beam (positioned close to the surface of the magnetic disk 101). Thus, the height A is further reduced. Consequently, the height of the ramp 115 is considerably smaller than in the conventional example shown in FIG. 14.

Figure 9:
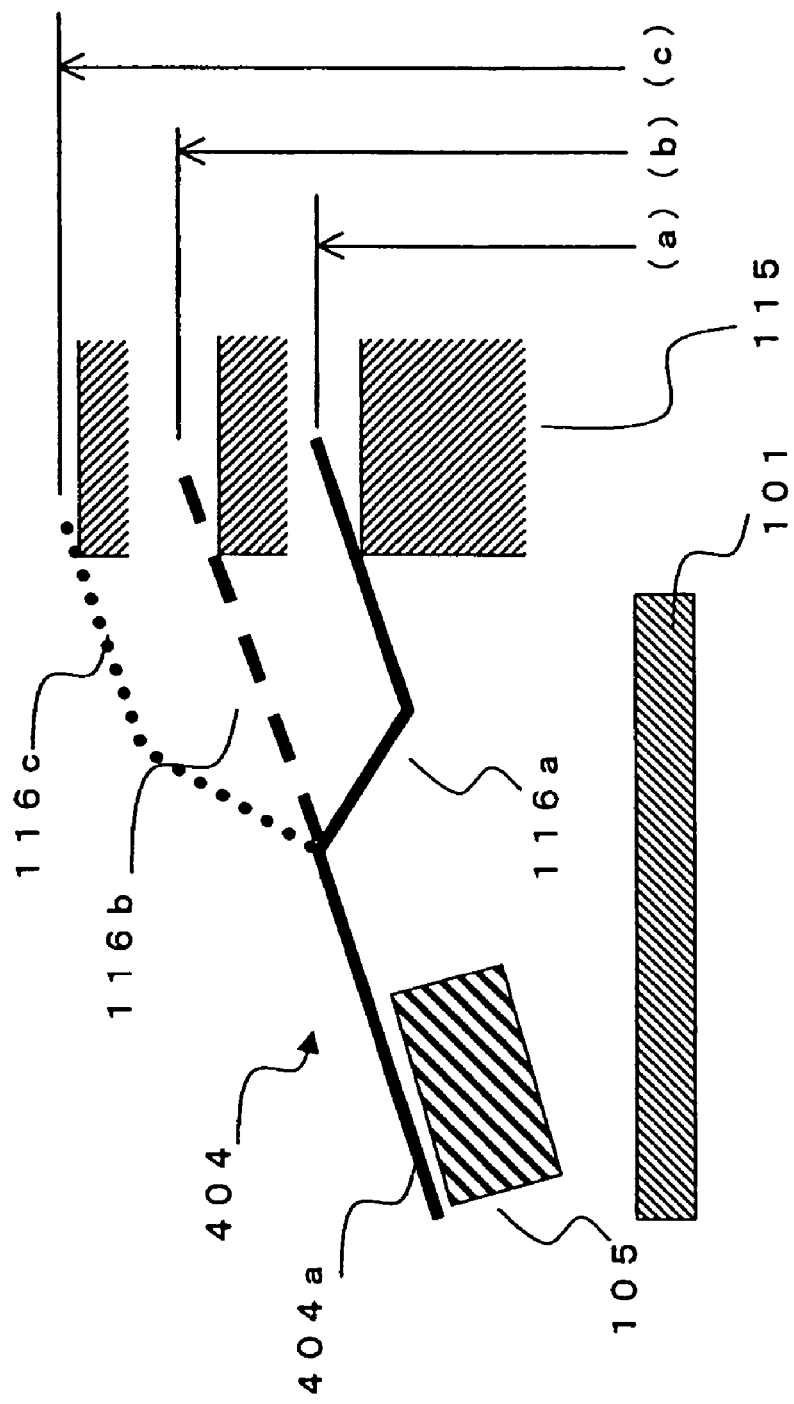
FIG. 9 illustrates the heights of a tab and a ramp in accordance with the embodiment.

FIG. 9 shows a state in which the tab 116 slides over the inclined surface of the ramp 115 to lift the load beam 404 to a predetermined height at the time of unloading.

Height (a) is the maximum tab height that prevails when the tab 116a according to the present embodiment, which is bent toward the magnetic disk 101, is used. Height (b) is the maximum tab height that prevails during the use of a conventional tab 116b that is not bent and is equal in height to the head support section 404a of the load beam 404. Height (c) is the maximum tab height that prevails during the use of a conventional tab 116c that is bent away from the magnetic disk 101. The term "maximum height" refers to the maximum height that is reached when the tab is lifted for loading/unloading purposes.

When the head 105 is to be moved to a predetermined height from the magnetic disk 101 as described above, it is necessary to lift the tab 116 to the predetermined height H4. Heights (a) to (c) are the height that prevails when the tabs 116a-116c are lifted to the height H4.

The height required for lifting tab 116c to a predetermined position is the highest because the tab is bent away from the magnetic disk 101. The height required for lifting tab 116b to a predetermined position is the second highest because the tab is at the same height as the head support section 404a of the load beam 404. The height required for lifting tab 116a to a predetermined position is the lowest because the tab is bent toward the magnetic disk 101.

Since the tab 116 is bent toward the magnetic disk in the present embodiment, the load beam 404 may be lifted to a predetermined height when it is lifted by a small amount. Further, the head 105 may be properly separated from the magnetic disk 101 while the ramp height is small.

When the tab 116 is positioned lower and lower with respect to the head support section 404a of the load beam 404, it is possible to reduce the height A and the height of the ramp 115. To reduce the height A, it is preferred that the tab 116 be positioned lower than the magnetic disk side surface of the head support section 404a of the load beam 404. If the tab 116 is roughly flush with the upper surface of the head 105 (slider), the status and serial number of the head 105 are visible from the outside after completion of an assembly process. Further, it is most preferred that the height of the tab 116 be equivalent to the flying height of the head 105, that is, the distance between the ABS of the head 105 and the surface of the magnetic disk 101 that prevails while the head 105 is positioned over the magnetic disk 101.

In reality, the height of the tab 116 that prevails while the head 105 is positioned over the magnetic disk 101 is determined to prevent the tab 116 from coming into contact with the magnetic disk 101 while considering the deflection of the suspension 110, including the deflection of the tab 116, that occurs when an external shock is applied. The amount of such deflection may be determined according, for instance, to the rigidity and length (weight) of the tab 116. Further, the height of the tab 116 is determined while considering a mechanical error. The mechanical error includes, for instance, a shape error of the tab or of the head support section of the load beam, a dimple height error, a slider thickness error, an error that may occur when the slider is attached to the gimbal, and a magnetic disk inclination error.

The height of the tab 116 is such that the tab 116 does not come into contact with a cover 201 or base 102 when the tab 116 is lifted for unloading purposes (the head support section 404a does not come into contact with the cover 201 or base 102 when the head support section 404a is lifted for unloading purposes). FIG. 10(a) shows a state in which the tab 116a according to the present embodiment, which is bent toward the magnetic disk, is lifted. FIG. 10(b) shows a state in which the conventional tab 116b, which is not bent, is lifted.

As described above, the tab height for lifting the head 105 to a predetermined height may be rendered lower when the tab is bent toward the magnetic disk than when the tab is not bent or is bent away from the magnetic disk. Therefore, the tab 116a shown in FIG. 10(a) may be rendered lower than the tab 116b shown in FIG. 10(b) when the tab is lifted. Further, the height of the cover 201 may be rendered lower when tab 116a is used than when tab 116b is used.

Further, the height of the tab 116 is such that the tab 116 does not come into contact with another tab 116 when the tab 116 is lifted for unloading purposes (the head support section 404a does not come into contact with another head support section 404a when the head support section 404a is lifted for unloading purposes). FIG. 11(a) shows a state in which the tab 116a according to the present embodiment, which is bent toward a magnetic disk, is lifted in a situation where two magnetic disks are used. FIG. 11(b) shows a state in which the conventional tab 116b, which is not bent, is lifted in a situation where two magnetic disks are used. When a tab is lifted in a situation where a plurality of magnetic disks are used, the tab comes close to another tab for the neighboring magnetic disk as indicated in the figures.

Figure 10:
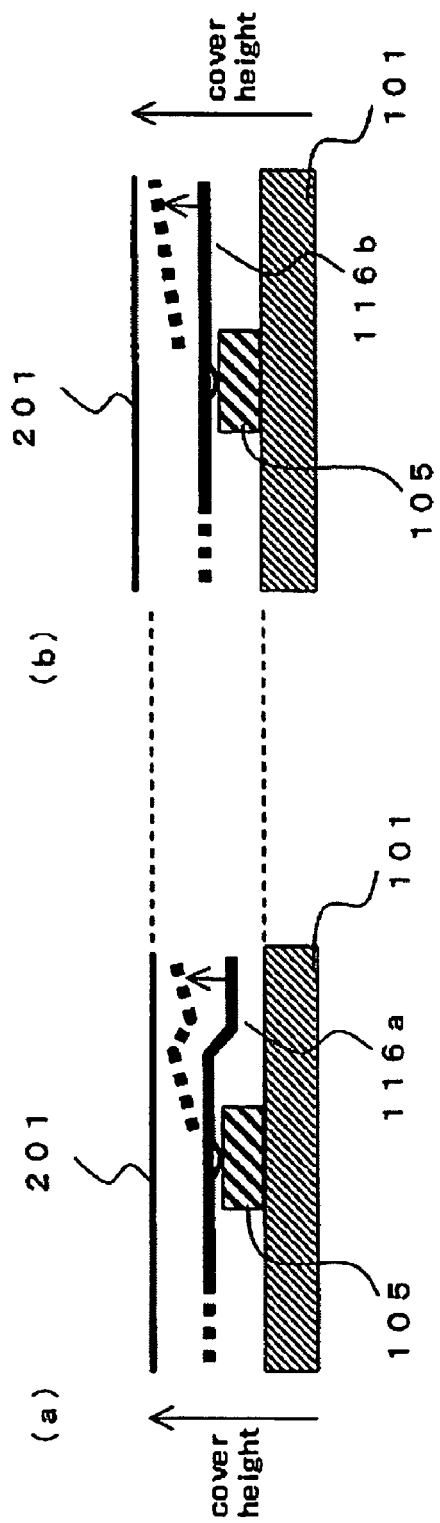
FIG. 10 illustrates a state in which a tab according to the embodiment is lifted.

As is the case in FIG. 10, the tab lift amount decreases when the tab is bent toward the magnetic disk. Therefore, the tab 116a shown in FIG. 11(a) is positioned lower than the tab 116b shown in FIG. 11(b) when the tab is lifted. Further, the distance between magnetic disks may be rendered smaller when tab 116a is used than when tab 116b is used.

Figure 11:
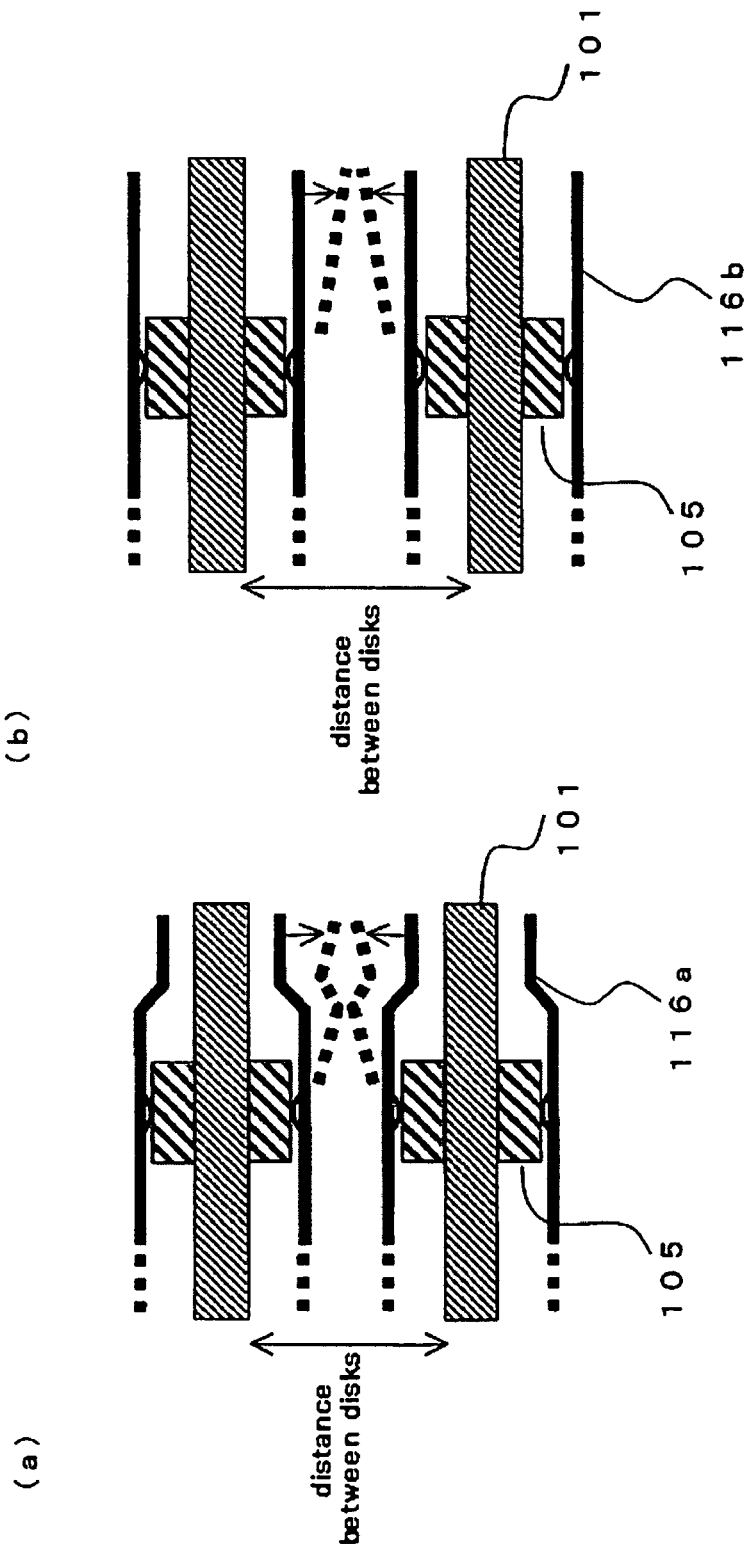
FIG. 11 illustrates a state in which a tab according to the embodiment is lifted.

If the bend height of the tab 116 is increased, the head support sections 404a come into contact with each other or a head support section 404a comes into contact with the cover 201 (or the base 102). If, on the contrary, the bend height of the tab 116 is decreased, the leading ends of tabs 116 come into contact with each other or a tab 116 comes into contact with the cover 201 (or the base 102). Therefore, as indicated in FIGS. 10 and 11, the vertical distance between the magnetic disk surface and the contact point between the tab 116 and ramp 115 should be nearly equal to the vertical distance between the magnetic disk surface and the head support section (the tab's bend) 404a that is farthest from the magnetic disk surface for the purpose of minimizing the thickness of the hard disk drive. However, if the leading ends of tabs 116 come closer to each other, the inclination of the whole suspension decreases during unloading. Therefore, the whole hard disk drive may be rendered thinner than when the head support sections 404a come close to each other. Thus, the height of the head support sections 404a may be rendered higher than the height of the contact point between the tab 116 and ramp 115. When the head support sections 404a come closer to each other, the distance between the swing shaft 107 and the leading end of the head support section 404a decreases. Therefore, the vibration occurring during loading/unloading decreases to provide enhanced impact resistance. Consequently, the vertical distance between the magnetic disk surface and a head support section 404a that is farthest from the magnetic disk surface may be rendered greater than the vertical distance between the magnetic disk surface and the contact point between the tab 116 and ramp 115.

As described above, the present embodiment may reduce the height of the ramp because it positions the ramp so that the ramp and magnetic disk do not overlap each other. In addition, the present embodiment may further reduce the height of the ramp by bending the tab beyond the head support section of the load beam and toward the magnetic disk. Therefore, it is possible to reduce the height of the cover and the distance between magnetic disks. Consequently, the hard disk drive may be made thinner.

The present invention may be applied not only to hard disk drives but also to various storage devices that optically process stored data. The present invention is also applicable to a data storage device having either a read head or write head.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims along with their full scope of equivalents.

What is claimed is:

1. A data storage device comprising:
   a head which accesses a recording region of a recording medium;
   a ramp which is positioned circumferentially apart from an outermost edge of the recording medium to unload the head from a surface of the recording medium; and
   an actuator which includes a load beam for supporting the head and moves the head;
   wherein the load beam includes:
   a head support section to support the head; and
   a tab which is extended forward, beyond the head support section, and toward the recording medium and which slides over a surface of the ramp,
   wherein the head support section includes a flange, which is formed by bending both rims that are extended in a longitudinal direction,
   wherein the flange is also formed on the tab, and
   wherein the flange of the head support section and the flange of the tab merge forming a continuous flange.

2. The data storage device according to claim 1, wherein the tab is extended from a center of the load beam.

3. The data storage device according to claim 1, wherein, when the tab is in contact with the ramp, a vertical distance between the recording medium surface and a contact point between the tab and the ramp is nearly equal to or greater than a vertical distance between the recording medium surface and the farthest portion of the head support section from the recording medium surface.

4. The data storage device according to claim 1, wherein, when the tab is in contact with the ramp, a vertical distance between the recording medium surface and the farthest portion of the head support section from the recording medium surface is greater than a vertical distance between the recording medium surface and a contact point between the tab and the ramp.

5. The data storage device according to claim 1, wherein a maximum vertical distance between the recording medium surface and the ramp surface includes a height of a point of contact between the tab and the circumferential end of the ramp and a lift amount for moving the head away from the recording medium surface.

6. The data storage device according to claim 1, wherein the distance between the tab and the recording medium surface includes an amount of tab deflection that occurs upon impact.

7. The data storage device according to claim 1, wherein, the tab is U-shaped as viewed from the ramp, and a convex surface of the U-shaped tab slides over the ramp surface.

8. The data storage device according to claim 1, wherein the head is disposed above a recording disk at a position of contact between the tab and the ramp's circumferential end that is positioned beyond a position for unloading the head and toward the recording medium.

9. A data storage device comprising:
   a head which accesses a recording region of a recording medium;
   a ramp which is positioned circumferentially apart from an outermost edge of the recording medium to unload the head from a surface of the recording medium; and
   an actuator which includes a load beam for supporting the head and moves the head;

wherein the load beam includes:

a head support section to support the head, and a tab which is extended from the head support section's center on the side toward a leading end of the load beam, and which slides over a surface of the ramp, wherein the head support section includes a flange, which is formed by bending both rims that are extended in a longitudinal direction, wherein the flange is also formed on the tab, and wherein the flange of the head support section and the flange of the tab merge forming a continuous flange.

10. The data storage device according to claim 9, wherein, when the tab is in contact with the ramp, a vertical distance between the recording medium surface and a contact point between the tab and the ramp is nearly equal to or greater than a vertical distance between the recording medium surface and the farthest portion of the head support section from the recording medium surface.

11. The data storage device according to claim 9, wherein, when the tab is in contact with the ramp, a vertical distance between the recording medium surface and the farthest portion of the head support section from the recording medium surface is greater than a vertical distance between the recording medium surface and a contact point between the tab and the ramp.

12. The data storage device according to claim 9, wherein a maximum vertical distance between the recording medium surface and the ramp surface includes a height of a point of contact between the tab and the circumferential end of the ramp and a lift amount for moving the head away from the recording medium surface.

13. The data storage device according to claim 9, wherein the distance between the tab and the recording medium surface includes an amount of tab deflection that occurs upon impact.

14. The data storage device according to claim 9, wherein, the tab is U-shaped as viewed from the ramp, and a convex surface of the U-shaped tab slides over the ramp surface.

* * * * *